(12) United States Patent
Jalali

(10) Patent No.: US 11,916,644 B2
(45) Date of Patent: Feb. 27, 2024

(54) APPARATUS AND METHODS TO PROVIDE COMMUNICATIONS TO AERIAL PLATFORMS

(71) Applicant: Bridgewest Finance LLC, San Diego, CA (US)

(72) Inventor: Ahmad Jalali, San Diego, CA (US)

(73) Assignee: Bridgewest Finance LLC, San Diego, CA (US)

( * ) Notice: Subject to any disclaimer, the term of this patent is extended or adjusted under 35 U.S.C. 154(b) by 0 days.

(21) Appl. No.: 17/244,834

(22) Filed: Apr. 29, 2021

(65) Prior Publication Data

US 2022/0103245 A1 Mar. 31, 2022

Related U.S. Application Data

(63) Continuation of application No. 15/456,233, filed on Mar. 10, 2017, now abandoned.

(Continued)

(51) Int. Cl.
*H04B 7/185* (2006.01)
*H01Q 21/06* (2006.01)
(Continued)

(52) U.S. Cl.
CPC .......... *H04B 7/18504* (2013.01); *H01Q 1/28* (2013.01); *H01Q 3/04* (2013.01); *H01Q 3/06* (2013.01); *H01Q 3/24* (2013.01); *H01Q 9/0407* (2013.01); *H01Q 21/065* (2013.01); *H04B 7/18502* (2013.01); *H04W 16/28* (2013.01);
(Continued)

(58) Field of Classification Search
CPC ....................... H04B 7/18504; H04B 7/18502; H04B 1/692; H01Q 1/28; H01Q 3/04; H01Q 3/06; H01Q 3/24; H01Q 9/0407; H01Q 21/065; H04W 16/28; H04W 28/0236; H04W 28/0268; H04W 36/0061; H04W 72/0446; H04W 72/0453; H04W 72/046; H04W 24/08; H04W 36/30; H04W 36/32;
(Continued)

(56) References Cited

U.S. PATENT DOCUMENTS

2015/0236779 A1* 8/2015 Jalali .................. H04B 7/18504
342/367
2016/0134358 A1* 5/2016 Jalali .................. H04B 7/18504
455/11.1
(Continued)

*Primary Examiner* — Jae Y Lee
(74) *Attorney, Agent, or Firm* — KOS IP Law LLP

(57) ABSTRACT

Apparatus, systems and methods for the provision of high data rate and high throughput communications link for drones, in a bandwidth efficient manner. One set of embodiments describe apparatus and methods to mitigate interference from other systems when using the unlicensed radio frequency bands such as the Industrial Scientific and Medical (ISM) bands. Apparatus and methods are also described to enable association of the drone radio sub-system with an "optimal" cell site, such as when the drone uses a directional antenna beam to maximize system throughput. Configurations of a mechanically steerable directional antenna aperture are also disclosed. Other embodiments describe systems and methods to mitigate excessive amounts of interference, and to provide a reliable communications link for signaling and other mission-critical messages.

11 Claims, 12 Drawing Sheets

Related U.S. Application Data

(60) Provisional application No. 62/404,610, filed on Oct. 5, 2016.

(51) Int. Cl.

| | |
|---|---|
| *H01Q 1/28* | (2006.01) |
| *H01Q 3/04* | (2006.01) |
| *H04W 28/02* | (2009.01) |
| *H01Q 3/06* | (2006.01) |
| *H01Q 3/24* | (2006.01) |
| *H01Q 9/04* | (2006.01) |
| *H04W 16/28* | (2009.01) |
| *H04W 36/00* | (2009.01) |
| *H04W 72/0446* | (2023.01) |
| *H04W 72/0453* | (2023.01) |
| *H04W 72/044* | (2023.01) |
| *H04W 84/00* | (2009.01) |
| *H04B 1/692* | (2011.01) |
| *H04W 24/08* | (2009.01) |
| *H04W 36/30* | (2009.01) |
| *H04W 36/32* | (2009.01) |
| *H04W 84/12* | (2009.01) |
| *H04L 25/08* | (2006.01) |

(52) U.S. Cl.
CPC ... *H04W 28/0236* (2013.01); *H04W 28/0268* (2013.01); *H04W 36/0061* (2013.01); *H04W 72/046* (2013.01); *H04W 72/0446* (2013.01); *H04W 72/0453* (2013.01); *H04B 1/692* (2013.01); *H04L 25/08* (2013.01); *H04W 24/08* (2013.01); *H04W 36/30* (2013.01); *H04W 36/32* (2013.01); *H04W 74/0833* (2013.01); *H04W 84/005* (2013.01); *H04W 84/12* (2013.01)

(58) Field of Classification Search
CPC .......... H04W 74/0833; H04W 84/005; H04W 84/12; H04L 25/08
See application file for complete search history.

(56) References Cited

U.S. PATENT DOCUMENTS

2017/0301987 A1* 10/2017 Mack ................ H01Q 1/282
2018/0046187 A1* 2/2018 Martirosyan ......... B64C 39/024

* cited by examiner

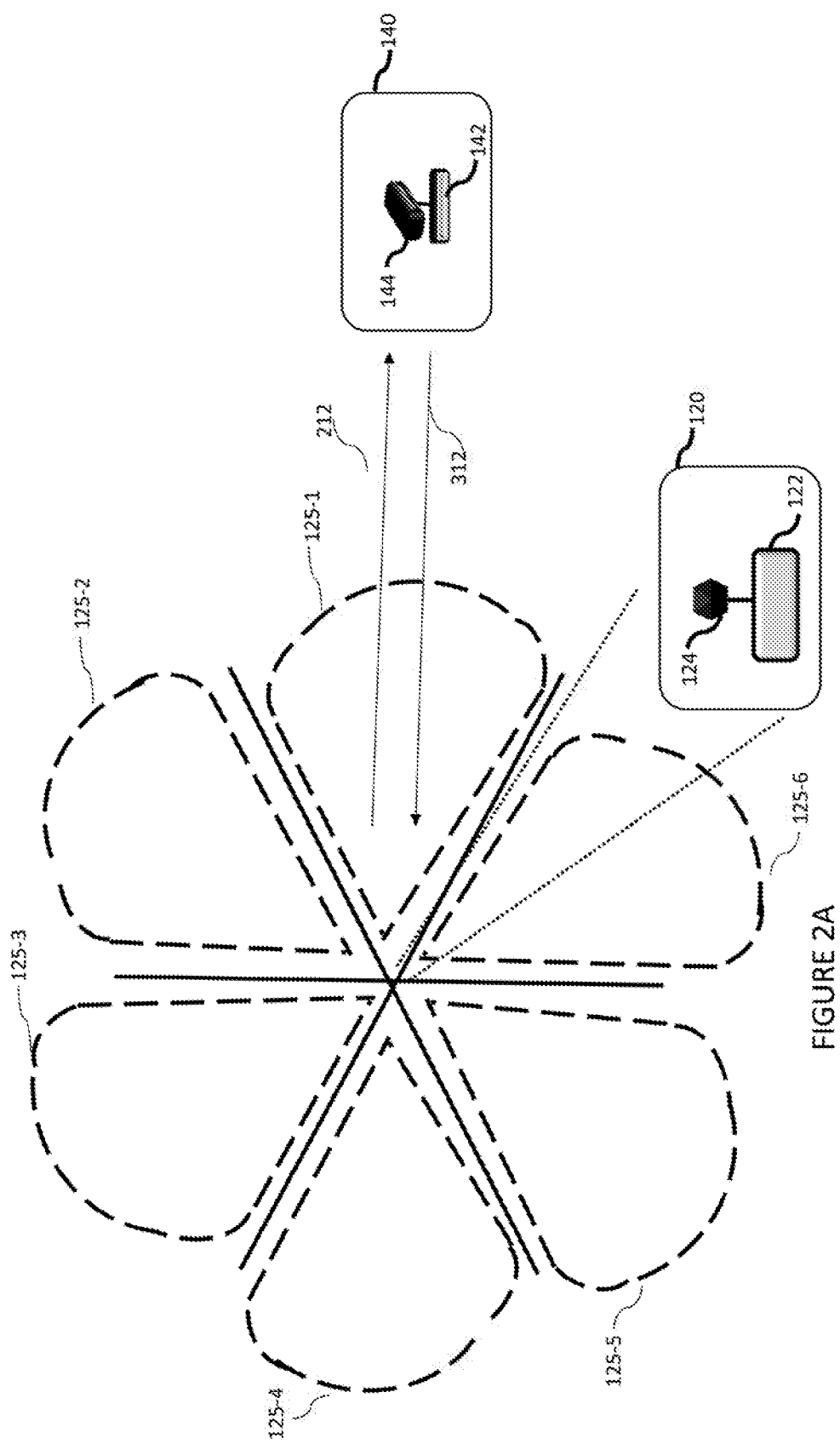

APPARATUS AND METHODS TO PROVIDE COMMUNICATIONS TO AERIAL PLATFORMS

PRIORITY APPLICATIONS

This application is a continuation of U.S. patent application Ser. No. 15/456,233, filed Mar. 10, 2017, which claims the benefit of priority to co-owned U.S. Provisional Patent Application Ser. No. 62/404,610, filed Oct. 5, 2016, and entitled "A NETWORK OF CELL SITES TO PROVIDE COMMUNICATIONS TO AERIAL PLATFORMS", which are incorporated herein by reference in their entirety.

RELATED APPLICATIONS

This application is related to co-owned, co-pending U.S. patent application Ser. No. 15/225,240, entitled "UNMANNED AERIAL VEHICLE (UAV) BEAM POINTING AND DATA RATE OPTIMIZATION FOR HIGH THROUGHPUT BROADBAND ACCESS", filed Aug. 1, 2016, co-owned, co-pending U.S. patent application Ser. No. 14/711,427, entitled "GROUND TERMINAL AND GATEWAY BEAM POINTING TOWARD AN UNMANNED AERIAL VEHICLE (UAV) FOR NETWORK ACCESS", filed on May 13, 2015, co-owned, co-pending U.S. patent application Ser. No. 14/626,698, entitled "BEAM FORMING AND POINTING IN A NETWORK OF UNMANNED AERIAL VEHICLES (UAVS) FOR BROADBAND ACCESS", filed on Feb. 19, 2015, co-owned, co-pending U.S. patent application Ser. No. 14/516,491, entitled "UNMANNED AERIAL VEHICLE (UAV) BEAM FORMING AND POINTING TOWARD GROUND COVERAGE AREA CELLS FOR BROADBAND ACCESS", filed on Oct. 16, 2014, co-owned, co-pending, U.S. patent application Ser. No. 14/486,916, entitled "ANTENNA BEAM MANAGEMENT AND GATEWAY DESIGN FOR BROADBAND ACCESS USING UNMANNED AERIAL VEHICLE (UAV) PLATFORMS", filed on Sep. 15, 2014, co-owned, co-pending, U.S. patent application Ser. No. 14/295,160, entitled "METHODS AND APPARATUS FOR MITIGATING FADING IN A BROADBAND ACCESS SYSTEM USING DRONE/UAV PLATFORMS", filed on Jun. 3, 2014, co-owned, co-pending, U.S. patent application Ser. No. 14/222,497, entitled "BROADBAND ACCESS TO MOBILE PLATFORMS USING DRONE/UAV", filed on Mar. 21, 2014, and co-owned, co-pending, U.S. patent application Ser. No. 14/223,705, entitled "BROADBAND ACCESS SYSTEM VIA DRONE/UAV", filed on Mar. 24, 2014, each of the foregoing incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure describes aspects of a system for providing communications and/or data access including e.g., broadband internet and network access (also generally referred to as "internetworks"), to aerial platforms such as general aviation aircraft, commercial aircraft, and drones, using a network of terrestrial cell sites. In exemplary aspects, the present disclosure describes systems, apparatus, and methods to mitigate interference received in the communications link between an aerial platform and a cell site e.g., from other interfering cell sites and transmitters of extraneous systems. These systems, apparatus, and methods, inter alia, maximize the throughput and link reliability of the proposed aerial platform communications system.

2. Description of Related Technology

It is expected that drones will be deployed in large numbers for applications such as package delivery, surveillance, data collection in sectors such as for example construction and agriculture, firefighting, and emergency response. Drones will require connectivity to an air traffic control system, as well as to internetworks such as the Internet and data centers. Many drones will collect large amounts of video data in segments (such as e.g., construction, farms, firefighting, and emergency response), and will require high speed data links to upload the data to data centers in real time for processing.

Unfortunately, interference poses specific problems for such large scale deployments of aerial platforms at broadband access speeds. In particular, new technologies are needed to deliver broadband access to drones at high data rate, low cost, and ubiquitously. Examples of current broadband delivery systems to drones include conventional cellular networks and satellite systems. These current broadband access systems have a number of shortcomings for providing broadband access, including particularly to drones. For instance, usage projections forecast that the drone population will continue to expand (e.g., as many as 10,000 drones per metropolitan area), and a commensurate amount of capacity in the conventional cellular networks will be needed to service them. The additional capacity requirement may result in a shortfall of available service for smart phones, and/or potentially increase wireless data plan prices due to the limited nature of the commodity.

Geo-stationary satellites are another option. In metropolitan areas, satellite capacity is typically more expensive than that of the terrestrial solutions. Moreover, since drones generally use small antennas with limited reception capabilities, the satellite must compensate by providing a higher gain link to maintain the drone to satellite communications link. Such increased gain requirements for satellites can also increase the operational cost of the satellite-based drone connectivity.

Hence, what are needed are methods and apparatus for providing broadband access to drones, including one or more of the attributes of high data rate, high throughput, reliable, cost effective, and/or ubiquity.

SUMMARY

The present disclosure describes, inter alia, systems, apparatus, and methods to mitigate interference received in the communications link between an aerial platform and a cell site e.g., from other interfering cell sites and transmitters of extraneous systems.

In a first aspect, a system to provide broadband access to drones is disclosed. In one embodiment, the system includes: a network of cell sites comprising one or more base stations, each base station comprising a cell radio sub-system, and a cell antenna sub-system configured to form at least one directional beam; a plurality of drones that each comprise a drone radio sub-system, a position location determination unit, and a drone antenna sub-system comprising an antenna aperture configured to form a steerable directional beam. In one exemplary configuration, each drone radio sub-system is further configured to: store a plurality of position locations associated with a plurality of cell sites of the network of cell sites; instruct the drone antenna sub-system to steer a beam toward a specific cell site based on a drone position coordinate and a specific position coordinate of the specific cell site; measure a downlink signal quality measurement on a received signal from the specific cell site; and receive uplink signal quality measurements provided within the received signal from the specific cell site. The uplink signal quality measurements are e.g., associated with the specific cell site.

In one variant, the drone antenna sub-system is further configured to steer the antenna aperture on at least one axis to point the steerable directional beam toward the specific cell site. In one case, the drone antenna sub-system comprises a mechanical steering mechanism configured to rotate the antenna aperture from a center of the antenna aperture.

In another variant, the drone radio sub-system is further configured to: divide a network coverage area into a number of contiguous geographic bins; and maintain a candidate cell site association table with an entry for each one of the number of contiguous geographic bins. The candidate cell site association table comprises for example a list of cell sites that are available to establish a communications link based on an uplink or downlink signal quality. For at least one candidate cell site within the list of cell sites, the drone radio sub-system measures the downlink signal quality for the at least one candidate cell site (or receives the uplink signal quality from the at least one candidate cell site), and associates with the at least one candidate cell site based at least in part on the uplink or downlink signal quality. In one such implementation, the drone radio sub-system is further configured to hand off to a different cell site when the uplink or downlink signal quality of the communications link to the at least one candidate cell site falls below an acceptable threshold or otherwise meets a prescribed criterions. In another such implementation, the drone radio sub-system is further configured to hand off to a different cell site based on a current position location and the candidate cell site association table.

In one variant, the antenna aperture comprises an array of patch elements with at least one row and/or at least one column of patch elements.

In another variant, at least one of the cell radio sub-system and drone radio sub-system creates one or more spread channels that spread encoded bits in time or frequency. In one case, at least one of the cell radio sub-system and drone radio sub-system communicate using an Institute of Electrical and Electronics Engineers (IEEE) 802.11-compliant protocol. The IEEE 802.11-compliant protocol may be compliant with for instance IEEE 802.11ac. In still another variant, the received signal is received over the one or more spread channels.

In yet another variant, at least one of the cell radio sub-system and drone radio sub-system communicate using a frequency band associated with an unlicensed shared Industrial Scientific and Medical (ISM) band.

A method for receiving broadband access at a drone is also disclosed. In one embodiment, the method includes: storing a plurality of position locations associated with a network of cell sites; steering a beam toward a specific cell site of the network of cell sites based on a drone position coordinate and a specific position coordinate of the specific cell site; measuring a downlink signal quality measurement on a received signal from the specific cell site; and receiving an uplink signal quality measurements from the specific cell site. The steered beam is characterized for example by a frequency within an unlicensed frequency band.

In one variant, the steering comprises mechanically rotating an antenna aperture about a fixed axis. In other variants, the steering comprises electrically forming the beam from a patch array of antenna elements.

A method for providing broadband access to at least one drone is further disclosed. In one embodiment, the method includes: forming at least one directional beam toward the at least one drone within an unlicensed frequency band; receiving a beam from the at least one drone; measuring the uplink signal quality from the at least one drone; and transmitting the uplink signal quality measurements to the at least one drone.

Further, a drone radio sub-system is disclosed. In one embodiment, the drone radio sub-system includes: a position location determination sub-system configured to determine a drone position coordinate; and a drone antenna sub-system configured to steer a directional beam. In one configuration, the drone radio sub-system is adapted to: store a plurality of position locations associated with a network of cell sites; steer the directional beam toward a specific cell site based on the drone position coordinate and a specific position coordinate of the specific cell site; measure a downlink signal quality measurement on a received signal from the specific cell site; and receive uplink signal quality measurements from the specific cell site.

In one variant, the drone antenna sub-system is configured to generate the directional beam within an unlicensed frequency band. In one such variant, the received signal from the specific cell site is received within the unlicensed frequency band. Additionally, the received signal from the specific cell site may be multiplexed in at least one of time and frequency within the unlicensed frequency band.

In another aspect, apparatus to provide broadband access to a drone are disclosed. In one embodiment, the apparatus include: a cell radio sub-system configured to transmit and/or receive signals to one or more aerial platforms via a cell antenna sub-system; the cell antenna sub-system configured to form at least one directional beam. In one variant, the cell radio sub-system is further configured to: partition a frequency band into one or more sub-frequency channels; partition at least one of the one or more sub-frequency channels into one or more data channels; and associate a first aerial platform to a first data channel of the one or more data channels.

In one variant, the one or more data channels occupy a number of time slots and at least one of the one or more sub-frequency channels. In some cases, a subset of the one or more data channels are allocated for shared data traffic that may be arbitrarily allocated to one or more applications or users. In some cases, a subset of the one or more data channels are allocated for dedicated data traffic that is allocated to a specific application or user. In still other cases, a subset of the one or more data channels are allocated for a random access channel for data transmission without an explicit bandwidth reservation.

In another variant, the cell radio sub-system is configured to transmit announcement messages via a first directional beam. In one such variant, the cell radio sub-system is further configured to receive association messages from the first aerial platform via a second directional beam. In some situations, the second directional beam is wider than the first directional beam.

In still other variants, the at least one directional beam can be dynamically adjusted to compensate for changing channel conditions.

A method for receiving broadband access at a drone is disclosed. In one embodiment, the method includes: steering a beam toward a specific cell site of the network of cell sites based at least on a drone position coordinate, and a specific position coordinate of the specific cell site; searching for announcement messages sent from the specific cell site; determining a frequency band of the specific cell site, the frequency band comprising one or more sub-frequency channels partitioned into one or more data channels; and when a received announcement message for the specific cell site satisfies an association criteria, transmitting an association message on an uplink channel of the specific cell site.

In one variant, the association criteria comprises a minimum signal quality associated with the frequency band.

In another variant, the association criteria comprises a higher signal quality associated with the frequency band compared to a signal quality associated with another cell site.

In still another variant, the method further includes determining at least one channel assignment for the uplink channel via the received announcement message.

In still other variants, the method includes transmitting the association message on the uplink channel of the specific cell site comprises a number of transmissions. In one such case, the number of transmissions is based on the number of uplink sub-beams used by the specific cell site.

A drone apparatus is disclosed. In one embodiment, the drone apparatus includes a drone radio sub-system configured to transmit and/or receive signals to one or more ground terminals via a drone antenna sub-system; and a drone antenna sub-system configured to steer a directional radio frequency beam. In one embodiment, the drone radio sub-system is configured to: determine a frequency band of a specific cell site, the frequency band comprising one or more sub-frequency channels partitioned into one or more data channels steer the directional radio frequency beam toward the specific cell site; and associate with the specific cell site.

In one variant, the one or more data channels comprise at least shared data traffic that may be arbitrarily allocated to one or more applications or users.

In another variant, the one or more data channels comprise at least dedicated data traffic that is allocated to a specific application or user.

In still other variants, the frequency band comprises an unlicensed frequency band.

In one such variant, the one or more data channels are each allocated one or more time slots and one or more sub-frequency channels.

These and other aspects shall become apparent when considered in light of the disclosure provided herein.

BRIEF DESCRIPTION OF THE DRAWINGS

In the following figures, where appropriate, similar components are identified using the same reference label.

FIGS. 2A and 2B are graphical depictions of exemplary base stations communicating with drones in conjunction with some embodiments described herein.

All Figures© Copyright 2016-2017 Ubiqomm, LLC. All rights reserved.

DETAILED DESCRIPTION

The present disclosure describes, inter alia, aspects of a system designed to provide broadband access to aerial platforms such as drones.

The capital expenditure cost of a cellular network includes the spectrum acquisition cost, hardware cost of the base stations that are installed at each cell site, and the cost of base station installation. Generally speaking, a significant amount of bandwidth (e.g., at least 20 Megahertz (MHz)) is needed to provide adequate throughput for large numbers of drones (e.g., more than 10,000 drones within a metropolitan area). 20 MHz of licensed spectrum nationwide has auctioned for billions of dollars in recent years. On the other hand, there is about 500 MHz of unlicensed spectrum available in the 5 GHz Industrial Scientific and Medical (ISM) radio band for use without any license cost. The ISM band is, however, shared by many users/systems and subject to limits on the device and base station transmit power. It is desirable to provide connectivity to drones using unlicensed assets such as the 5 GHz ISM band. However, in order to provide high data rate and reliable communications in the ISM band, techniques must be devised to significantly mitigate interference received from, e.g., other systems deployed in the band.

In this disclosure, one set of exemplary embodiments describe systems and methods to filter out the interference received from other systems, and to make the drone communications link highly robust to excessive amounts of interference. These techniques allow use of the exemplary ISM band for drone communications, resulting in significant spectrum cost saving as noted supra. Moreover, the techniques described herein may be broadly applicable to (i) any unlicensed band including without limitation future additions to the ISM band and/or reclaimed frequency allocations, or (ii) licensed bands where the cost/benefit calculation warrants use of such band.

As mentioned above, base station hardware cost and installation at the cell sites is also a major capital expenditure for building networks that provide broadband access to cell phones or drones. Therefore, it is desirable to minimize the number of cell sites needed in the network to provide adequate capacity for communications to the drones. In order to reduce the number of required cell sites, the data throughput by the base station in each cell site should be maximized. The embodiments in this disclosure also describe systems and methods to maximize the data throughput of each cell site.

Beamwidth and Directionality Selection—

Figure 1:
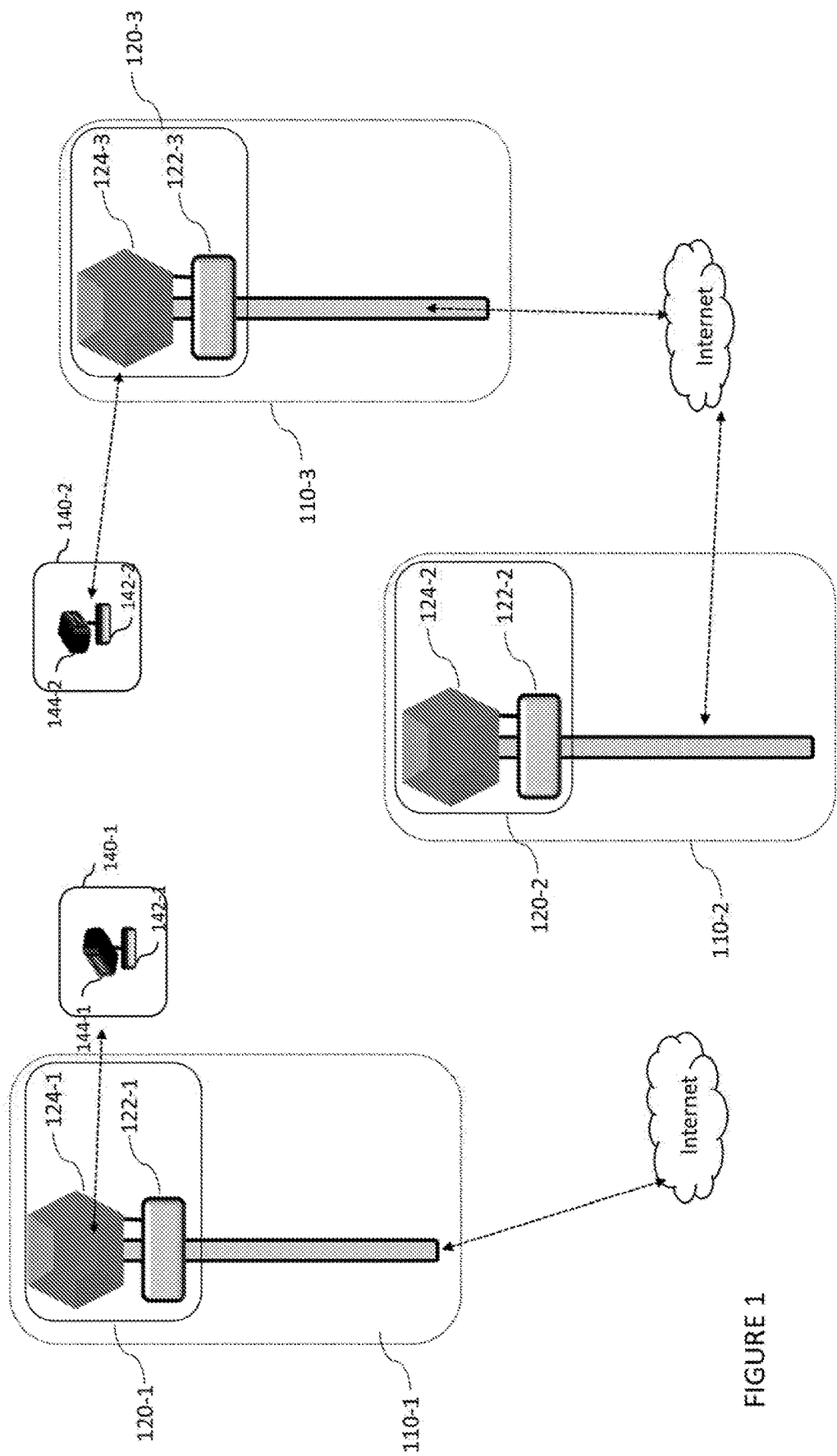
FIG. 1 is a graphical depiction of an exemplary terrestrial network of base stations useful in conjunction with various embodiments described herein.

FIG. 1 illustrates a wireless network including a number of cell sites 110-$j$. At each cell site, a base station 120-$j$ including a radio sub-system 122-$j$ and an antenna sub-system 124-$j$ is installed, where j is an integer identifying different occurrences of the same sub-system. The base station radio sub-system 122 is comprised of at least a transmitter, a receiver, a processor, and a non-transitory computer readable medium. In FIG. 1, the base station antenna is shown on top of towers. The base stations and their antennas may alternatively be installed on top of tall buildings with open view over a large area, or in yet other modes, such as atop a natural topological feature such as a hill. Drones 140-$j$ are comprised of a radio sub-system 142-$j$ and an antenna sub-system 144-$j$. The drone radio sub-system 142 is comprised of at least a transmitter, receiver, a processor, and a non-transitory computer readable medium. In some embodiments, the drone radio sub-system is also equipped with a position location determination device such as GPS (Global Positioning System) or other similar systems such as Global Navigation Satellite System (GLONASS), Assisted-GPS (A-GPS), etc. Drones 140-$j$ communicate with the cell sites 120-$j$ from which they receive the strongest signal quality such as the highest Signal to Interference plus Noise Ratio (SINR). In the absence of extraneous interference from other systems, the closest cell site to the drone is the one from which the drone receives the strongest signal strength and best quality.

The available frequency spectrum is in the illustrated configuration divided into a set of contiguous frequency bands; each of the contiguous frequency bands is referred to as a frequency channel. For instance, the IEEE 802.11ac standard divides the available spectrum in the 5 GHz ISM band into frequency channels of bandwidths 20, 40 or 80, or 160 MHz each. Each frequency channel is referred to by the frequency bandwidth it occupies, e.g. a 20 MHz frequency channel describes a frequency channel that occupies 20 MHz of contiguous frequency spectrum. It will be appreciated, however, that use of contiguous bands is not essential.

FIG. 2A shows an exemplary diagram of a six (6) sector cell site. The bulb shaped coverage footprints 125-$j$ represent the beams produced by sector antennas for each sector numbered j. Each beam is characterized by a coverage area based on an angular coverage (or beamwidth) and a coverage distance. Still other antenna configurations and/or coverage areas may be substituted with equivalent success by those of ordinary skill in the related arts, given the contents of the present disclosure. For example, a multi-antenna array may be used to create a beam-formed coverage area so as to e.g., compensate for environmental or other effects.

As a brief aside, a so-called "omnidirectional" antenna radiates (generally) equal power in all radial directions. A "directional" antenna has a peak effective radiated power within a so-called "main lobe." The main lobe can be pointed e.g., toward a transceiver for optimal link performance. The term "beamwidth" refers to an angular coverage of a directional antenna. Typically, the beamwidth is defined as the angular region where the antenna provides at least half (e.g., −3 decibels (dB)) of the peak effective radiated power of the main lobe. As shown in the system of FIG. 2A, the downlink (cell site to drone) and uplink (drone to cell site) beams have substantially the same beamwidth (only one beam and label 125-$j$ is used to depict the uplink and downlink beams in each sector). In subsequently described embodiments, the downlink and uplink beams have different beamwidths (see e.g., FIG. 3). If the cell site base station simultaneously transmits to drones in all six (6) sectors on the same frequency channel as shown in FIG. 2A, then the signals in adjacent sectors will cause inter-sector interference and result in low signal-to-interference-plus-noise ratio (SINR) for drone receivers that are close to the sector boundaries. For example, as the drone 140 moves closer to the boundary between sectors 125-1 and 125-2 (which are using the same frequency channel), the drone 140 will be unable to differentiate between the sectors. Reduced SINR directly corresponds to reduced data rates in the affected regions. In one embodiment, adjacent sectors are assigned different frequency channels, in order to improve the SINR at the sector boundaries.

Figure 2B:
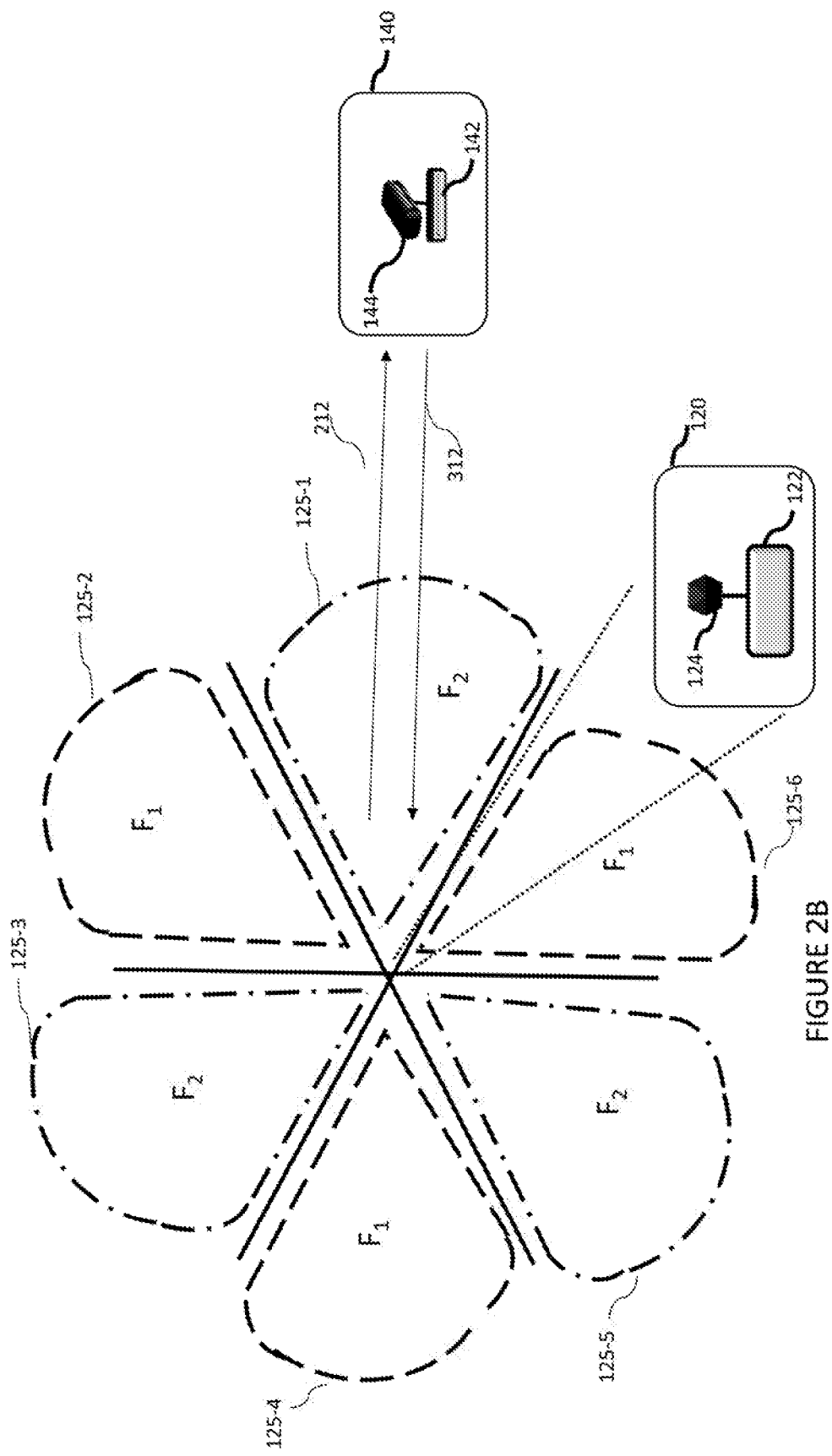

FIG. 2B illustrates a system where adjacent sectors use different frequency channels in order to minimize inter-sector interference at sector boundaries, thereby increasing data rate in those regions. For instance, in the so-called "frequency reuse" of two (2) depicted in FIG. 2B, the available spectrum is divided into two sets of channels ($F_1$ and $F_2$), each of the two sets assigned to alternating sectors so that no two adjacent sectors use the same frequency channel. The two types of dashed lines shown for beams on FIG. 2B pictorially illustrate that the corresponding beams are transmitting/receiving on different frequencies. More generally, the term "frequency reuse" refers to frequency allocation schemes that stagger geographical or spatial use of a number of frequency bands so as to minimize interference between areas using the same frequency. Higher order frequency reuse factors (e.g., three (3), four (4), or higher) can be used to provide more separation and better performance, but may require complex network management. Moreover, it will be appreciated that the frequency reuse within a given system (or portion of the system) may be asymmetric; e.g., applied to only a subset of the spatial distribution of the system, and/or applied differently in different portions of the system.

Referring back to the system of FIGS. 2A, 2B, in one embodiment each sector radio sub-system transmits an announcement message 212 which may be received by the drones in the corresponding sector. The announcement message contains system information such as sector identification and system operational parameters. The drone radio sub-system 142 searches for announcement messages from the cell sites, until it detects at least one announcement message. Alternatively, the drone(s) may "ping" one or more cell sites (or a given geographic area generally) to elicit a response (announcement) from one or more such cell sites.

The detected announcement message contains network and sector specific information that can be used by the drones to associate with the network and the sector. Upon receiving one or more announcement messages 212, the drone selects a sector with the strongest announcement message and sends an association message 312 to the selected sector. The association message 312 requests an association (or to associate) with the corresponding sector.

In one embodiment, once a drone is associated with a sector, the drone receives/transmits data to the wireless network and/or broader interne (or Internet) via the corresponding sector until, as described later herein, the drone switches association to a different sector or cell site. For instance, the drone may handover to a different sector/cell site when the signal quality between the drone and its currently associated sector falls below acceptable thresholds, and/or where the drone may receive a stronger signal from the other sector or cell site. Alternatively, other criteria or considerations may drive the handover decision process (or at least be part of it), such as economic ramifications of use of one sector/cell site) over another, past reliability or performance history, anticipated future "crossover" of a cell site where communication may be lost (see discussion below), or yet other factors.

In one exemplary embodiment, the beamwidth of the antenna beams at the drone and the base station are narrowed in at least the azimuthal dimension so as to filter out interference from extraneous and/or external systems operating in the ISM unlicensed band. Moreover, narrow beamwidth base station/drone antenna beams may also serve to filter interference from other cell sites/drones of the same system, thereby allowing the reuse of all available spectrum at each cell site. Furthermore, narrow azimuthal beams can be used to maximize received SINR at the base station/drone receiver to achieve high data rates and throughput. It will further be appreciated that other "beam-shaping" techniques (including narrowing in dimensions other than azimuth, such as elevation) may also be employed consistent with the present disclosure in order to maximize received SINR.

Artisans of ordinary skill in the related arts will readily appreciate that reusing as much spectrum as possible at each cell site increases the data throughput of the network. To these ends, narrower beamwidths of an antenna in one or more dimensions (e.g., elevation, azimuth, etc.) can be created with a larger sized antenna in that dimension. For example, a base station sector antenna that is operating at 5.5 GHz and having an aperture area about 0.5 square meters has a peak gain of at least 31 dBi (decibels isotropic; a measure of the gain of an antenna compared with an ideal isotropic antenna that uniformly distributes energy in all directions) and a half power beamwidth of about 5 degrees. Certain deployment scenarios can accommodate large sized antennas (e.g., an antenna of size about 0.5 square meter) at the cell site in each sector; e.g., there may be adequate physical space at the cell site tower or on top of a building. In one exemplary embodiment, an antenna with about 31 dBi peak gain and beamwidth of about 5 degrees, provides a narrow beamwidth to filter significant amount of interference from other systems or drones, and high enough gain to achieve high data rate on the uplink.

Unfortunately, there is limited space and weight allocation available for existing drone platforms. To these ends, solutions for a drone antenna structure that has a narrow beamwidth in azimuth while minimizing the size of the antenna and the structure that supports the antenna are desired. In one embodiment, the base station and drone antennas support two (2) polarizations which may be e.g., two (2) linear or two (2) circular polarizations. In some embodiments, the base station and drone radio sub-systems transmit two (2) parallel streams of data, one on each of the two (2) antenna polarizations, in in order to increase the data rate and the system throughput.

Figure 4A:
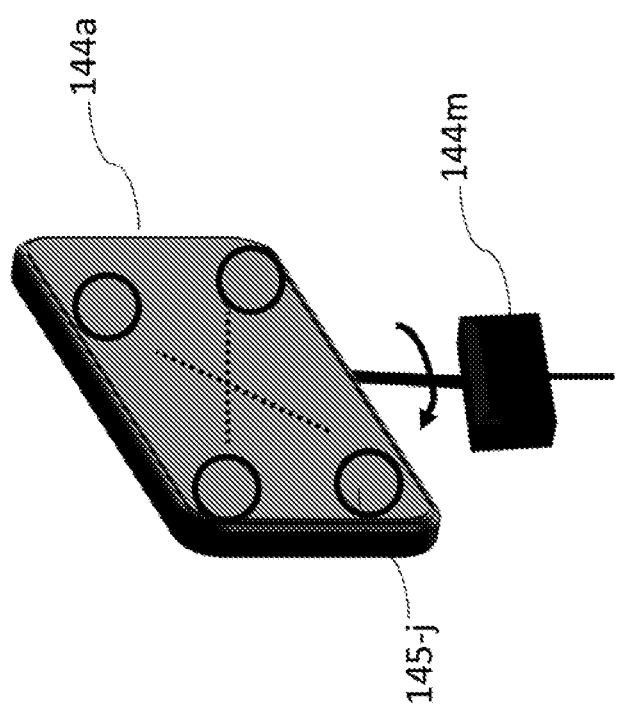
FIGS. 4A and 4B are graphical depictions of an exemplary drone antenna sub-system in conjunction with some embodiments described herein.

One exemplary mechanically steerable drone antenna mechanism is pictorially depicted in FIG. 4A. The antenna system includes an antenna aperture 144a and a mechanical steering structure 144m. One candidate antenna aperture 144a design is a patch array with rows and columns of patch antenna elements 145-j. The mechanical steering structure 144m rotates the antenna aperture 144a in at least one dimension (e.g., in the azimuthal dimension). The drone radio sub-system 142 computes the direction toward which the antenna aperture 144a may point to maximize received signal quality, and instructs the mechanical steering mechanism 144m to steer the antenna aperture 144a in the corresponding direction. In one embodiment, the antenna aperture is steered from the bottom center of the antenna aperture (as shown in FIG. 4A) so as to minimize the space that the antenna sub-system will occupy as the antenna aperture 144a rotates in 360 degrees. In this case, as the antenna aperture with width w and height h is rotated around its bottom center, the antenna aperture will occupy a cylindrical volume of diameter w and height h. This scheme minimizes the volume and the weight that the antenna sub-system occupies while steering a high gain and narrow beamwidth beam in e.g., a 360 degrees of azimuth.

In addition to mechanical steering, artisans of ordinary skill in the related arts will readily appreciate that a patch array of antenna elements can be used to electrically form a directional beam. Electrical formation of an antenna beam is based on signal processing techniques that combine transmission or reception elements in a phased array such that desired signal(s) constructively interfere while undesirable signals and noise experience destructive interference. Common additional signal processing techniques that are readily appreciated by those of ordinary skill in the related arts (given the present disclosure) and which may further improve electrical beam forming performance include e.g., signal filtering and/or spreading.

Figure 4B:
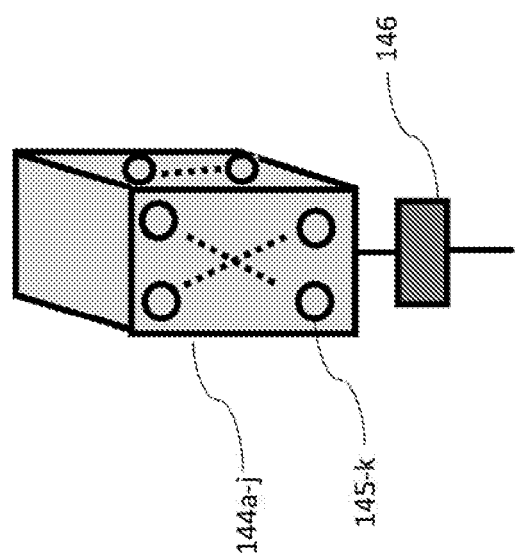

FIG. 4B illustrates a drone directional antenna design according to another embodiment, comprised of a number of antenna apertures 144a-j, where j denotes the different occurrences of the antenna aperture, and an antenna aperture beam selection sub-system 146. Each antenna aperture 144a-j forms a beam toward a specific direction in 360 degrees. FIG. 4B shows an exemplary drone antenna with four (4) antenna apertures placed around the four (4) sides of the box. The drone radio sub-system: (i) determines the direction that the drone antenna beam should point so as to maximize received signal quality, (ii) selects the appropriate antenna aperture for the corresponding beam pointing direction, and (iii) instructs the antenna aperture beam selection sub-system 146 to transmit to and/or receive from the cell site using the corresponding selected antenna aperture. The antenna aperture of FIG. 4B shows a number of antenna elements 145-k, where k is an integer denoting different occurrences of the antenna element, which are phased to form a beam for the corresponding antenna aperture. One candidate antenna aperture design is a patch array with patch elements 145-k. Note that the antenna aperture beam selection sub-system 146 may be instructed by the drone radio sub-system, to combine two (2) adjacent antenna apertures 144a-j to form and steer a beam in a given direction. Combining two (2) antenna apertures will result in a higher beam gain at the boundary of two (2) antenna apertures.

Artisans of ordinary skill in the related arts will, given this disclosure, readily appreciate that base station antennas that are optimized to point toward horizon or a few degrees above the horizon may have very low gain at very high elevation angles above horizon. Similarly, the gain of the drone antenna at large angles below the horizon may be very low if the drone antenna aperture is mainly designed to point toward the horizon. Therefore, the gains of the base station and drone antennas may be too low to close the link between the drone and the base station when the drone is above a cell site, or is at high elevation angles relative to the cell site. One solution to providing connectivity to a drone when the drone is in the vicinity of a cell site is to have the drone communicate with a distant cell site but at a lower data rate until the drone moves away from the cell site.

In another embodiment, the cell site may be equipped with an antenna that e.g., points substantially upwards and is characterized by high gains toward high elevation angles. For example, an upwards pointing antenna beam is illustrated by the dotted circle 126 in FIG. 6. When a drone is in the vicinity of the cell site, the drone radio sub-system may communicate with the base station radio sub-system using the upwards pointed antenna aperture (126 in FIG. 6). Similarly, the drone antenna sub-system may also be equipped with an antenna aperture that points downwards to provide high gain toward a cell site that is in the vicinity of the drone. In such implementations, the drone radio sub-system may use the antenna aperture with the downward-pointing beam that has a high gain at large angles below the horizon to communicate with the base station radio sub-system when the drone is in the vicinity of the base station. In one embodiment, the upwards pointing base station antenna beam (126 in FIG. 6) operates on a different frequency channel than the frequency channels used by beams 125-*j* (125-1 through 125-6 in FIG. 6), in order to minimize cross-interference between the beams (125-1 through 125-6 in FIG. 6) covering distant locations from the cell site and the beam covering locations near the cell site (126 in FIG. 6) as described above.

At initial drone radio sub-system power up, the drone radio sub-system 142 instructs the drone antenna sub-system 144 to point the antenna aperture 144*a* toward one of the plurality of the cell sites 110-*j* in the network. In one embodiment, the drone radio sub-system 142 has a position location determination device such as a GPS unit that provides the position coordinates of the drone, and is also configured to access or obtain the geographic position coordinates of all the cell sites in the network which are close enough to the drone to be able to establish a communications link with the drone. Yet other schemes may be used, such as a sector- or raster-scan approach looking for peaks in signal strength or other RF parameters when the positions of cells are not known a priori to the drone or are otherwise not accessible (see discussion below).

In one embodiment, the drone radio sub-system 142 may instruct the antenna sub-system 144 to steer its aperture 144*a* toward the cell site that is closest to the drone at initial drone radio power up. As mentioned above, the drone radio sub-system 142 searches for announcement messages 212 sent by the base stations 120-*j*. Extraneous interference at the closest cell site may prevent reliable communication in some scenarios; consequently, the drone radio sub-system may need to choose a cell site that has the highest SINR for initial association. The interference seen by the cell site radio sub-system 122-*j* when pointing a beam toward a drone 140 may be different from the interference that the drone 140 measures when pointing its antenna beam toward the cell site 120-*j*. Therefore, the drone radio sub-system 142 may consider both the SINR seen on the drone to cell site (uplink) and the cell site to drone (downlink) directions to choose a cell site which will provide adequate SINR in both directions.

Since the drone antenna may be highly directional, the drone radio sub-system may only be able to measure downlink signal quality from at most one cell site toward which the drone antenna aperture is pointing. In some variants, a mechanism for measuring uplink and downlink signal quality from multiple cell sites is needed to find a cell site with adequate uplink and downlink signal quality. Downlink signal quality may be measured from the announcement message sent by all sectors. In one such variant, the drone radio sub-system sequentially instructs the drone antenna sub-system 144 to steer the drone antenna aperture 144*a* toward a set of candidate cell sites and measure the downlink SINR to each cell site (based on the announcement message).

Next, the drone radio sub-system chooses a cell site with highest SINR, from among a set of candidate cell sites with adequate downlink SINR, with which to associate.

Once the drone associates with a given cell site, the radio sub-system of the corresponding cell site will measure the SINR received from the drone on the uplink, and if the SINR is not adequate will inform the drone radio system so that the drone radio sub-system can try another cell site from among the candidate cell sites with adequate downlink SINR to communicate with. In other words, the drone radio sub-system may sequentially associate with a number of candidate cell sites to measure SINRs on the downlink from each candidate cell site, and also transmit to each candidate cell site so that each candidate cell site radio sub-system may measure the uplink SINR from the drone and report the measured uplink SINR to the drone radio sub-system.

In one exemplary embodiment, the radio sub-system chooses a cell site with adequate SINR on uplink and downlink based on certain metrics. Artisans of ordinary skill in the related arts, given the contents of the present disclosure, will appreciate that any number of other signal quality metrics besides SINR may also be used (whether alone or in combination) to determine a cell site with adequate signal quality with which to reliably communicate. Common examples of such metrics include without limitation: signal quality (e.g., as measured by SINR), latency, bit error rate (BER), block error rate (BLER), packet error rate (PER) and throughput. More generally, any number of connectivity metrics may be substituted with equivalent success, by one of ordinary skill given the contents of the present disclosure. For example, some embodiments may additionally consider network congestion, power consumption, historical reliability, and/or compatibility.

In one embodiment, the drone radio sub-system determines a cell site with which to associate without knowledge of the drone's position coordinate or the position coordinates of the cell sites. In this embodiment, the drone antenna sub-system may be instructed to steer its beam in multiple directions e.g., in 360 degrees of azimuth and/or various degrees of elevation (e.g., the horizon and below), and search for announcements messages in each direction. The drone radio sub-system measures the signal quality on the received announcements messages, identifies the cell sites from which it receives announcements messages, and determines a list of cell sites from which the drone radio sub-system receives high enough signal quality with which to reliably communicate. The drone radio sub-system transmits messages to a subset of cell sites on the aforementioned list, and receives uplink signal quality measurements from the corresponding cell sites. Then, based on the downlink and uplink signal quality measurements from the cell sites, the drone radio sub-system chooses a cell site with adequate signal quality on both links with which to associate, according to some criterion. Common examples of such criterion may include without limitation, signal quality, network congestion, quality of service, cost considerations, power consumption, and/or compatibility. For example, the drone radio sub-system may select the link with the highest downlink throughput. In another example, the drone radio sub-system may select the link with the shortest uplink and downlink latencies.

In another embodiment, the coverage area of the network may be divided into a number of bins, and a table may be stored in each drone radio sub-system which contains the previously measured uplink/downlink SINRs of a set of cell sites close to the drone position in each of the geographic bins, referred to as the candidate cell site association table. The drone radio sub-system makes downlink SINR measurements, receives uplink SINR measurements from the cell site radio sub-systems, and updates the uplink/downlink SINRs for each position bin of the aforementioned table as the drone travels. At any time, the drone radio sub-system can reference a position bin in the candidate cell site association table where the drone is located, in order to determine a cell site with adequate downlink/uplink SINR with which to associate.

As a brief aside, interfering sources may be transmitting only part of the time and thus may only intermittently interfere. Thus, the cell site radio sub-system may need to make multiple uplink SINR measurements on the uplink messages sent by the drone in order to measure the uplink SINR under different interference conditions. Additionally, the drone radio sub-system may store the statistics of the uplink and downlink measured SINRs at each cell site sector in the aforementioned table for future reference. Previously gathered statistics ensure that the drone can reliably select a cell site sector with adequate uplink/downlink signal quality for communications on an as needed basis (e.g., without updating interference measurements).

As mentioned previously, the drone radio sub-system measures the downlink SINR, or some other signal quality metric, on the received messages from its associated cell site, and also receives uplink SINR/signal quality measurements from its associated cell site radio sub-system on measurements made on uplink messages sent by the drone. The drone radio sub-system may initiate a change of association to another cell site if the measured uplink/downlink SINRs fall below a threshold. In some cases, the drone may predictively switch associations based on e.g., the position of the drone within the network or historic quality measurements. Once the drone radio sub-system determines that an association with another cell site may be needed to provide a higher quality communications link, in one embodiment the drone may look up the entry of the candidate cell site association table within whose geographic bin the drone currently resides and choose a new cell site with which to associate. In another embodiment, the drone antenna sub-system may sequentially steer the drone antenna aperture toward a number of candidate association cell sites based on the position of the drone, measure the downlink signal quality from each cell site, receive uplink signal quality measurement from the corresponding cell sites, and choose a sector with adequate uplink/downlink signal quality with which to associate.

Once a cell site has been chosen as a candidate association cell site, the drone radio sub-system initiates association with the candidate cell site by sending a message to its currently associated cell site notifying the current associated cell site of the impending transfer to the candidate association cell site. The message includes the identification of the candidate cell site that the drone radio sub-system intends to associate with, and a corresponding frequency channel. The drone radio sub-system may also report its position coordinates to the currently associated cell site.

In other embodiments, the currently associated cell site sub-system may also be configured with the candidate cell site association table mentioned above. The currently associated cell site radio sub-system can initiate association of the drone with a new cell site (the candidate cell site) by sending a message to the drone that includes information on the chosen candidate cell site, and instructing the drone to steer its antenna beam and a frequency channel to tune to in order to associate with the candidate association cell site.

Once the drone radio sub-system steers its antenna beam toward the candidate association cell site, the drone radio sub-system searches for any announcement messages sent by the candidate association cell site. The specific sector of the cell site that provides the highest signal quality to the drone typically depends on the position of the drone relative to the position of cell site. Therefore, the drone radio sub-system will tune to a frequency channel that is expected to correspond to the strongest signal from the cell site, and search for announcement messages from the cell site on the tuned frequency channel. If after a certain time interval the drone radio sub-system does not receive an announcement message from the cell site, the drone radio sub-system may attempt to search other frequencies by tuning to a different frequency channel and searching for announcement messages on the new frequency channel until the announcement message is detected.

The above discussion considered the case where the drone needs to associate with a different cell site than it is currently associated with (where the drone is "handing over" to a different cell site). As previously noted, each cell site in the exemplary embodiment has multiple sectors, thus the drone may also need to change the sector of the cell site that it is communicating with as the drone travels. In one such case, the drone radio sub-system monitors the signal quality on the downlink from the sector and when the signal quality falls below a threshold or otherwise satisfies a handover criteria (e.g., based on the position of the drone, historic performance, etc.), the drone radio sub-system initiates an association with a neighboring sector of the cell site. During the association processes, the drone radio sub-system tunes to the frequency channel of the neighboring candidate association sector(s), and measures the downlink signal quality. The drone radio sub-system chooses the sector with the higher signal quality for association. Once a new sector has been determined, the drone radio sub-system sends an association message to the cell site, requesting to start communications with the new sector of the cell site.

Figure 3:
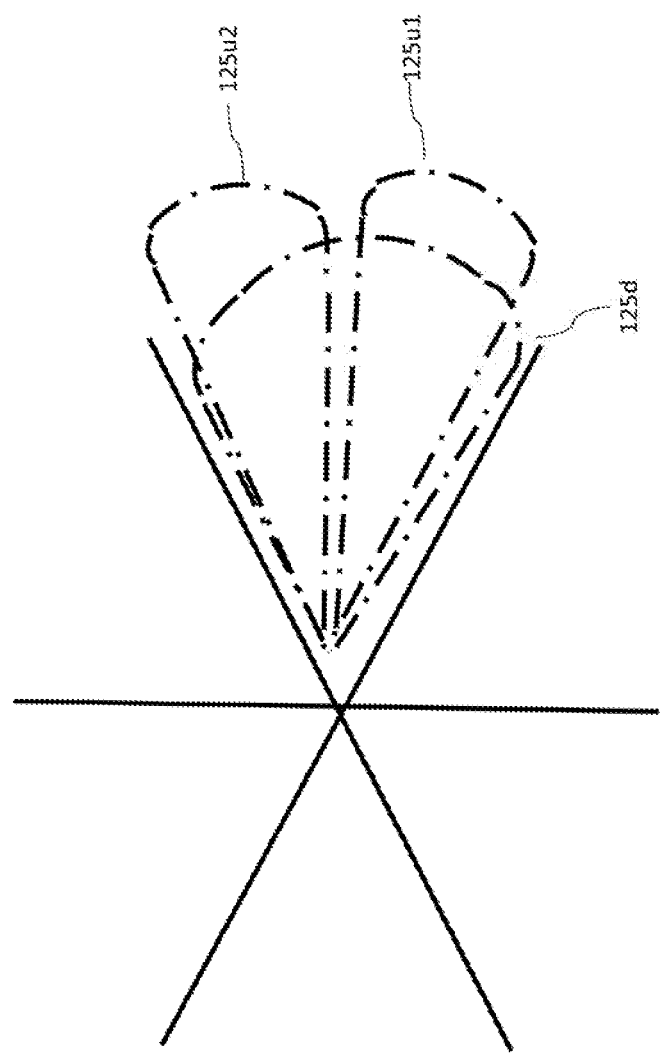
FIG. 3 is a graphical depiction of an exemplary cell site with different size beamwidths for uplink and downlink beams in conjunction with some embodiments described herein.

As mentioned previously, the beam for the downlink and uplink directions as shown in FIGS. 2A and 2B are of roughly the same size, and are identified with the same label 125-j. In alternative embodiments, the cell site may allocate different size beamwidth beams on the downlink and uplink, and have asymmetric capabilities. For instance, if the uplink beam of the cell site sector has a narrower beamwidth than the downlink beam, then the uplink beam will filter out more interference from other sources of interference in the network. A narrower uplink beamwidth may also provide higher SINR on the uplink, higher data rates and more reliable communications links between the drone and the cell site. FIG. 3, illustrates a case where the uplink beam 125u beamwidth is half of the downlink beam 125d. As shown in FIG. 3, the uplink includes two (2) sub-beams that correspond to each downlink beam in a given sector. Each uplink sub-beam will have three (3) decibels (dB) more gain (approximately a factor of two (2)) toward the desired drone. Moreover, the improved interference rejection of extraneous systems/transmitter noise could potentially result in more than three (3) dB of increase in SINR on the uplink direction.

Shared and Dedicated Channel Operation—

In some aspects of the present disclosure, the aggregate bandwidth of the link may be partitioned for use in a number of different ways. For example, the available frequency (bandwidth) on a given frequency channel may be further divided into a set of sub-frequency channels. Each sub-frequency channel be subdivided into multiple data channels that simultaneously transmit and/or receive. In one configuration, each data channel occupies a number of time slots and one or more sub-frequency channels; in some cases, the data channel may occupy the entire frequency channel. The combination of time slots and the sub-frequency channels assigned to a data channel determines the amount of bandwidth allocated to the data channel.

As a brief aside, two (2) types of data channels are described herein. So-called "shared" data channels are data channels that carry data that may be arbitrarily allocated among a variety of applications and/or number of users (e.g., via a broadcast or multicast paradigm). So-called "dedicated" data channels carry data that are dedicated for e.g., a particular user or a particular application, such as where QoS (quality of service) or other requirements must be met. Artisans of ordinary skill in the related arts will readily appreciate that such a distinction is made purely for illustrative purposes, other types of data channels and/or hybrids thereof may be substituted with equivalent success, given the contents of the present disclosure. For example, a shared or dedicated data channel may occupy all the sub-frequency channels of a given frequency channel during multiple time slots. For instance, the Institute of Electrical and Electronics Engineers (IEEE) 802.11ac standard assigns an entire frequency channel in the uplink or downlink to one device at a time.

Figure 5A:
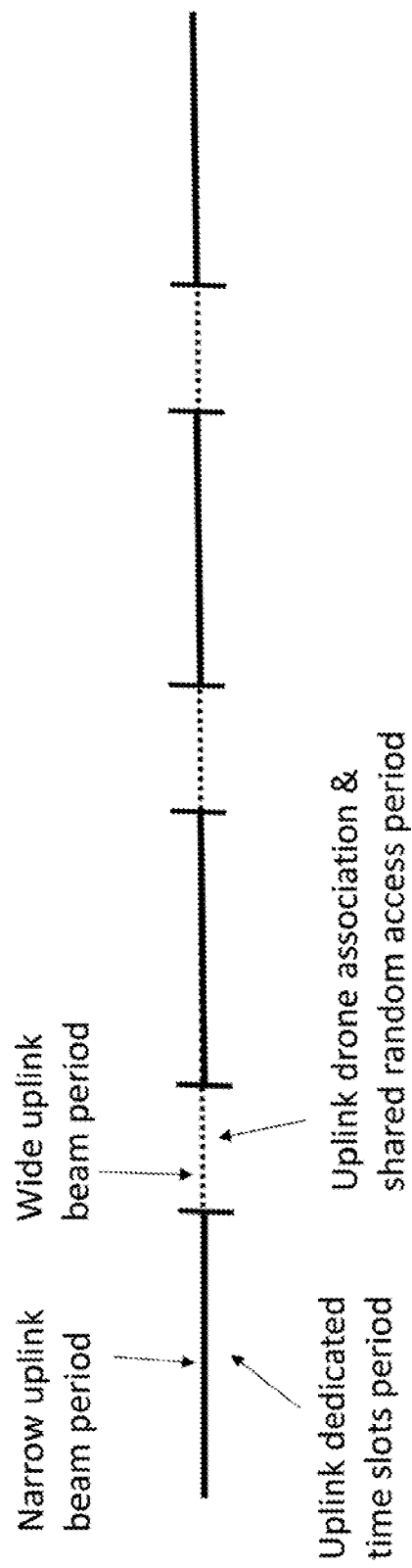
FIG. 5A is a logical representation of time periods with different uplink beamwidth antenna beams, in accordance with the principles described herein.

Referring now to FIG. 5A, an exemplary drone and base station radio sub-system can send signaling messages such as announcements and association messages on shared uplink and downlink channels. One uplink shared channel is a so-called "random access channel". A drone can send messages such as association and bandwidth request as well as short data packets on the random access channel. The remaining time slots and frequency channels may be allocated to dedicated channels where bandwidth is a priori reversed for specific drones on the uplink and downlink.

When there are multiple uplink sub-beams per one downlink, the base station radio sub-system may determine which uplink sub-beam to search/scan, so as to detect messages sent by the drone. During the initial drone association with a cell site, the base station antenna sub-system forms an analog beam to communicate with the drone. The drone radio sub-system searches for announcement messages sent by the cell site as described in previous embodiments that are transmitted on the analog beam. Upon receiving the announcement message (and when announcement message satisfies association criteria), the drone sends an association message on the uplink. In one embodiment, the base station's uplink beam (for receiving the association message) has a substantially wider beamwidth compared to the downlink beam (for transmitting the announcement message) such that the base station radio sub-system can detect the association message sent by the drone on the uplink beam. In other words, the base station uses a wider beamwidth for receiving the association message so as to account for drone movement and/or other signaling mismatches.

In some embodiments, the shared random access channel can be used by any (or all) drones to send small amounts of data to the base station without an explicit bandwidth reservation/assignment by the drone/base station. For example, as shown in FIG. 5A, the time interval may be divided into two (2) sections, shown by dotted and solid lines. During the dotted time interval (FIG. 5A), the base station radio sub-system expects association or random access messages from the drones, and uses a wider beam to search for messages from the drones. During the solid time intervals of FIG. 5A, the time slots are assigned/dedicated to specific drones, and the base station radio sub-system uses a narrow uplink beam to search for the drone's messages.

More generally, as will be appreciated by those of ordinary skill in the related arts, wider beamwidths can provide larger coverage areas. In contrast, narrower beamwidths can provide more gain and/or provide higher data rates. Accordingly, a selection of beamwidth may be tailored for particular reception requirements (e.g., area coverage, data rate). Moreover, beamwidth may be dynamically adjusted to compensate for changing channel conditions and/or connectivity requirements, including altitude changes of the drone itself (e.g., from a gust of wind).

In one embodiment, the drone radio sub-system is configured to include the drone's latest position coordinates in the "uplink" association message (the term "uplink" being used in the present context to refer to a mobile-to-cell site communication). Once the drone has associated with a cell site, the drone radio sub-system periodically sends the drone's position so that the cell site radio sub-system has substantially real time knowledge of the drone's position (within the reporting period granularity). The cell site radio sub-system can determine the optimal sub-beam on the uplink to search for the messages the corresponding drone sends based on the real time drone position. Specifically, the base station radio sub-system can assume that the drone is pointing an antenna beam toward the cell site location, thus the base station radio sub-system can determine which sub-beam of the uplink the drone is pointing its antenna beam at. The base station radio sub-system can use the optimal uplink sub-beam to search for uplink messages.

In one embodiment, the drone radio sub-system sequentially transmits an association message multiple times. In one such variant, the association message is transmitted a number of times that corresponds to the number of uplink sub-beams of the cell site radio sub-system. Following the transmission of the announcement message, the cell site radio sub-system sequentially switches from one uplink sub-beam to the next so that it can detect at least one of the multiple sequential association messages sent by the drone radio sub-system on at least one of the uplink sub-beams. Once the cell site radio sub-system detects one of the drone's association message, the cell site radio sub-system records the drone's position coordinates and thereafter performs a finer granularity search via its uplink sub-beam where the drone antenna is pointing based on the drone's position. When digital beamforming is employed at the base station radio sub-system, the base station's baseband processor may generate multiple uplink sub-beams digitally and search each of the digitally formed uplink sub-beams until it detects the uplink message from the drone.

Figure 6:
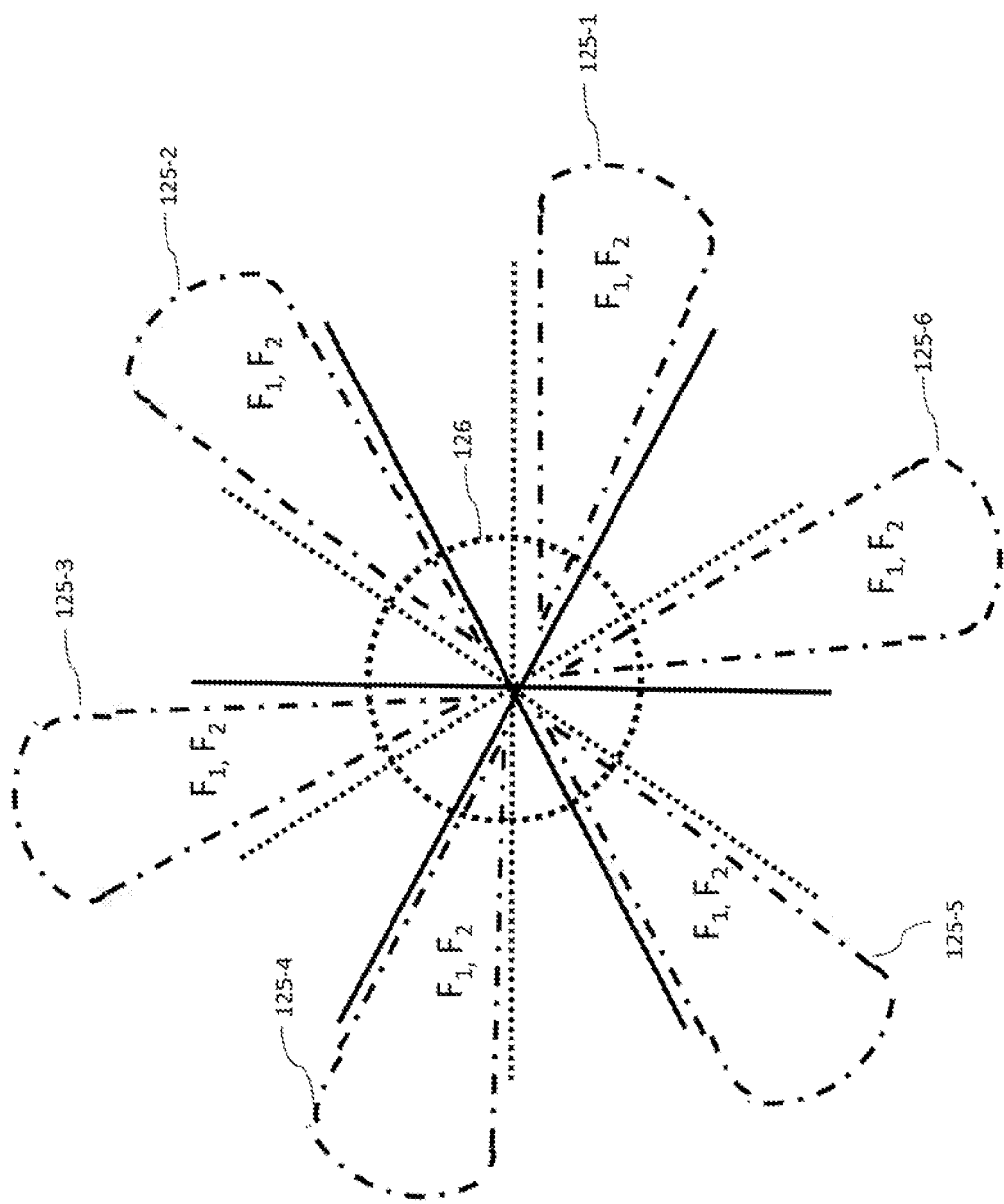
FIG. 6 is a graphical depiction of an exemplary cell site with multiple sub-sectors per each sector.

In one exemplary embodiment, the throughput of the system described in conjunction with FIGS. 2A and 2B may be further enhanced by using all frequency channels in all six (6) sectors simultaneously (referred to as frequency reuse factor of one (1) scheme). FIG. 6 shows one such cell site sectorization design including six (6) sectors delineated by solid lines, and two sub-sectors in each sector delineated by dotted lines. As illustrated in FIG. 6, both sets of frequency channels ($F_1$ and $F_2$) are simultaneously used in all sectors, but in only one of the two (2) sub-sectors of each sector. More directly, by no two (2) adjacent sub-sectors are simultaneously transmitting/receiving on the said frequency channels so as to maintain spatial isolation. The improved isolation results in higher SINR at the sub-sector/sector boundaries than would otherwise be achievable, while still providing all available spectrum in each sector. Such a configuration effectively doubles throughput as compared to a scheme of frequency reuse factor two (2) previously described. The base station radio sub-system of FIG. 6, divides the time slots in the uplink and downlink direction into two (2) sets, where each set is assigned to a different sub-sector of a sector. During one set of time slots, the base station radio sub-system transmits and receives data from drones in one of the sub-sectors. The base station radio sub-system does not simultaneously transmit or receive data on two (2) adjacent sub-sectors.

While FIG. 6 shows two (2) sub-sectors, artisans of ordinary skill in the related arts will readily appreciate that any number of sub-sectors may be substituted with equivalent success, given the contents of the present disclosure. The number of sub-sectors may be adjusted based on the beamwidth of the sector antenna; beamwidth is typically limited by the size of the antenna. For example, in a 5 GHz band, a 0.5 square meter antenna can support as many as eight (8) sub-sectors.

The foregoing discussion is generally illustrative of embodiments with a fixed number of downlink and uplink sub-beams per sector and/or a different number of sub-beams on the uplink and downlink. As noted above, uplink and downlink beams may adaptively be formed toward each drone during the uplink and downlink dedicated channels such that data is being received from and/or transmitted to one drone at a time. More generally, adaptive beam forming allows a base station antenna sub-system to point the peak of the beam toward each drone, thereby maximizing the SINR and the associated data rate.

Figure 5B:
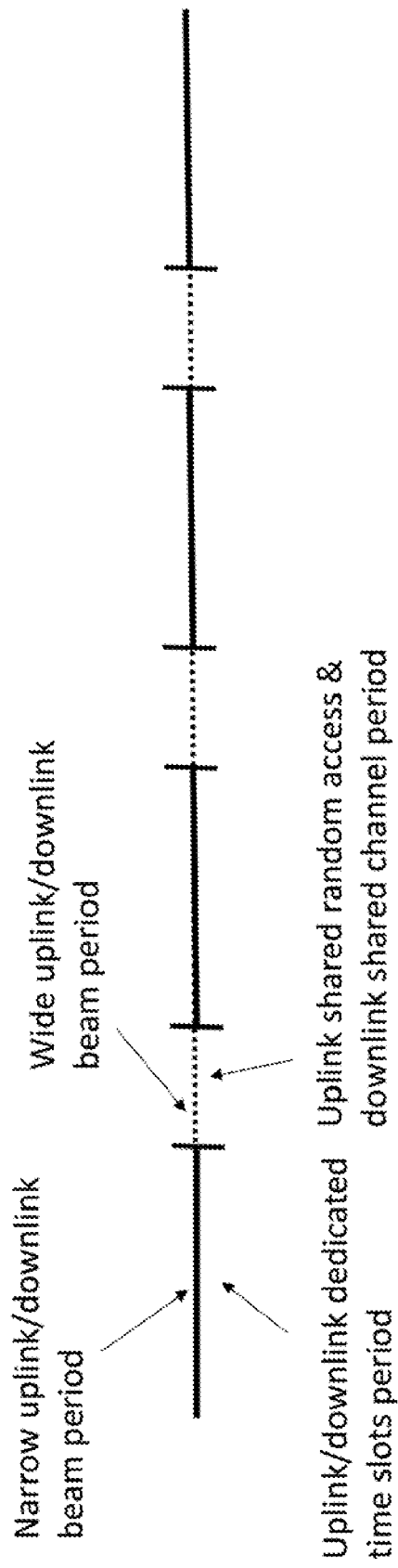
FIG. 5B is a logical representation of time periods with different uplink and downlink beamwidth antenna beams, in accordance with the principles described herein.

In another aspect of the disclosure, the base station may receive messages sent by the drones on the shared uplink channels, such as the uplink random access channel, and also send messages on the downlink to multiple drones at a time in the shared downlink channels. As shown in FIG. 5B, the time axis may be divided into time periods where the uplink/downlink shared and uplink/downlink dedicated data channels are active. Then, during the shared uplink/downlink data channel time periods, the uplink/downlink beams may be formed to be wide enough to receive or transmit messages from or to all drones in the base station sector's coverage area. In some variants, the shared uplink/downlink beams may be formed wide enough to receive or transmit messages from or to a subset of the drones in the base station sector's coverage area; the subset may be based on drone position location. For example, as previously noted above, the drones may send their position location to the base station; this position location information allows the base station to adaptively group similarly located drones and form narrow beams toward the subset of drones during the appropriate channel time periods.

Example Operation—

The following discussion provides an illustrative description of systems and methods whereby a narrow beam can be tailored to transmit or receive both shared and dedicated data channels in the sub-sectors. In the illustrative embodiment, the base station radio sub-system determines the drones that are located in each sub-sector so as to dynamically adjust transmissions on only a subset of the sub-sectors to minimize inter-sector interference. For example, the base station radio sub-system can allocate a shared downlink channel for each sub-sector to transmit announcement messages on the beam of the corresponding sub-sectors. In each sub-sector, the drones which have not associated with any base station can transmit an association message to the corresponding base station on the scheduled uplink shared channel for each sub-sector (responsive to receiving the announcement message). The association message will include the drone's position location coordinates e.g., to enable beamwidth selection and/or shared and dedicated channel spatial adjustments.

Figure 7:
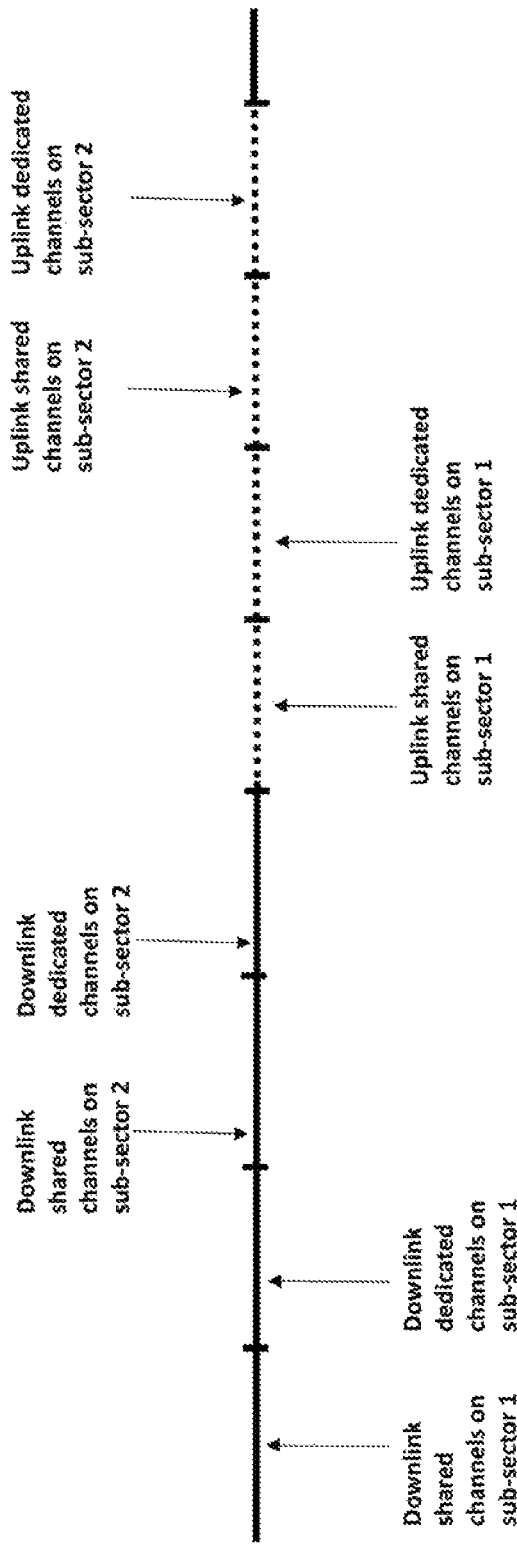
FIG. 7 is a graphical depiction of exemplary time periods of a downlink and uplink shared and dedicated channel bandwidth schedule for use within a time division duplex (TDD) system with multiple sub-sectors per sector.

Once the base station has received one or more association messages, the base station radio sub-system divides or allocates the remaining bandwidth (time slots and sub-frequency channels) for dedicated data channels among the different sub-sectors of a given sector based on the number of drones in each sub-sector, and the amount of traffic to/from those drones. FIG. 7 is an exemplary illustration of how the time is divided between uplink and downlink shared and dedicated channels for a TDD system where each sector is composed of two (2) sub-sectors. In FIG. 7, the solid time line illustrates the time allotted to downlink channels, and the dotted time line illustrates the time allotted to the uplink channels. In an FDD (Frequency Division Duplex) system, the available uplink and downlink channels are similarly divided between the different sub-sectors, but with the uplink and downlink channels assigned to a sub-sector running concurrently on different frequency bands.

The base station radio sub-system schedules bandwidth for each sub-sector and each drone, and sends a drone specific dedicated bandwidth schedule to each drone on the downlink shared channels. Drones may continuously monitor the downlink for data destined to them, or wake up to listen to the channel during the time slots where data is scheduled to the drone and of which the drone is a priori informed. The base station radio sub-system scheduler ensures that the sub-sectors that are simultaneously transmitting are sufficiently isolated (via e.g., spatial distances, time slots, frequency bands, spreading codes, and/or other multiplexing techniques) such that the inter-sector interference received at the drone from those sub-sectors is below a threshold in order to achieve high signal quality and data rates. In one embodiment of a TDD system where the base stations and drones alternately transmit at different times on the same frequency channel, the transmit time slots of all sub-sectors and all sectors that are simultaneously transmitting will be synchronized in order to avoid inter-sector interference. Therefore, all resources of the sub-sectors of a cell can be maximally utilized by either simultaneously receiving or simultaneously transmitting and the timing of the time slot boundaries of all sub-sectors are synchronized.

Once a drone and a cell site are associated and begin data transmission, the base station and drone radio sub-systems determine the highest data rate that can be supported by the uplink/downlink data channel e.g., the data rate corresponding to the probability of correctly decoded data packets based on the signal quality at the receiver. The base station and drone radio sub-systems can each maintain a table of the highest downlink/uplink data rates the base station and drone may reliably transmit in each geographic position bin where the drone may be located; in one such implementation, the table of data rates is referred to as the data rate indicator table.

One example of a uplink/downlink data rate calculation may be based on the link budget using knowledge of the base station and drone EIRP (Effective Radiated Isotropic Power) and the distance between the cell site and the drone for each geographic bin in which the drone resides. The link budget uses the transmitter and receiver parameters and the path loss between the transmitter/receiver to compute the SINR, or some other signal quality, at each receiver to determine the highest data rate achievable at the computed SINR values.

The values of the data rate indicator table may be dynamically updated using actual measurements of SINR (as described herein). For example, the drone and cell site make uplink and downlink SINR measurements and report the corresponding SINR values to each other during the course of ongoing communications. The base station and drone radio sub-systems each update the highest achievable data rates for their end of the link based on the measured SINR values.

As a brief aside, another technique that is very powerful in mitigating interference is spreading the data at the transmitter in time and in frequency, and de-spreading the data at the receiver to reduce the effect of interference. For instance, in the IEEE 802.11ac standard, the lowest modulation is BPSK (Binary Phase Shift Keying) specified in the 802.11ac so called MCS0 data channel. Coded BPSK modulation can decode the data packet with low probability of error (e.g., as low as two (2) dB of SINR). Consider an uncorrelated interferer with the same power as the desired signal e.g., a scenario where the received SINR of the MCS0 data channel is less than zero (0) dB; under such circumstances the coded MCS0 data channel would not be successfully decoded as it does not exceed the minimum tolerable SINR (two (2) dB). By transmitting the coded BPSK symbol twice, the received SINR can be increased with processing gain even in presence of the uncorrelated interferer. A perfect processing gain of the retransmitted signal would double the SINR (i.e., a gain of three (3) dB), which is more than adequate to decode the desired signal with low probability of error. More generally, repeating the BPSK symbol N times, can enable successful decode of the desired signal in the presence of up to N uncorrelated interferers with equal power as that of the desired signal. The spreading, repetition of coded symbols, may be done in any multiplexing domain (e.g., time, frequency, spreading code or other.)

In order to ensure that messages carrying critical system parameters and signaling information are delivered reliably, a number of time slots are assigned on one or more frequency channels, such as 20 MHz channel in the IEEE 802.11 family of standards, with spreading to mitigate extraneous interference from other systems. The amount of spreading to achieve a low packet error rate (e.g., less than 1%) may be determined based on the statistics of the measured interference, the higher the variance of interference power the higher the amount of spreading. The resulting time/frequency channel is referred to as the spread signaling channel. A spread signaling channel can reliably deliver messages such as the IEEE 802.11 base station beacon, registration, encryption, bandwidth request, bandwidth grant, and other critical messages.

The drone radio sub-system associates with a cell site using the systems and methods described in the previous embodiments. Depending on the interference levels, the association procedure may be carried out on the spread signaling channel described above or on the nominal channels. For instance, the drone may attempt to detect the announcement message of the cell sites on a nominal channel, and to send the corresponding association message on the nominal channels. If the association procedure is not successful, the drone radio sub-system may then switch to the more reliable spread channels to attempt the association procedure.

Apparatus—

Figure 8:
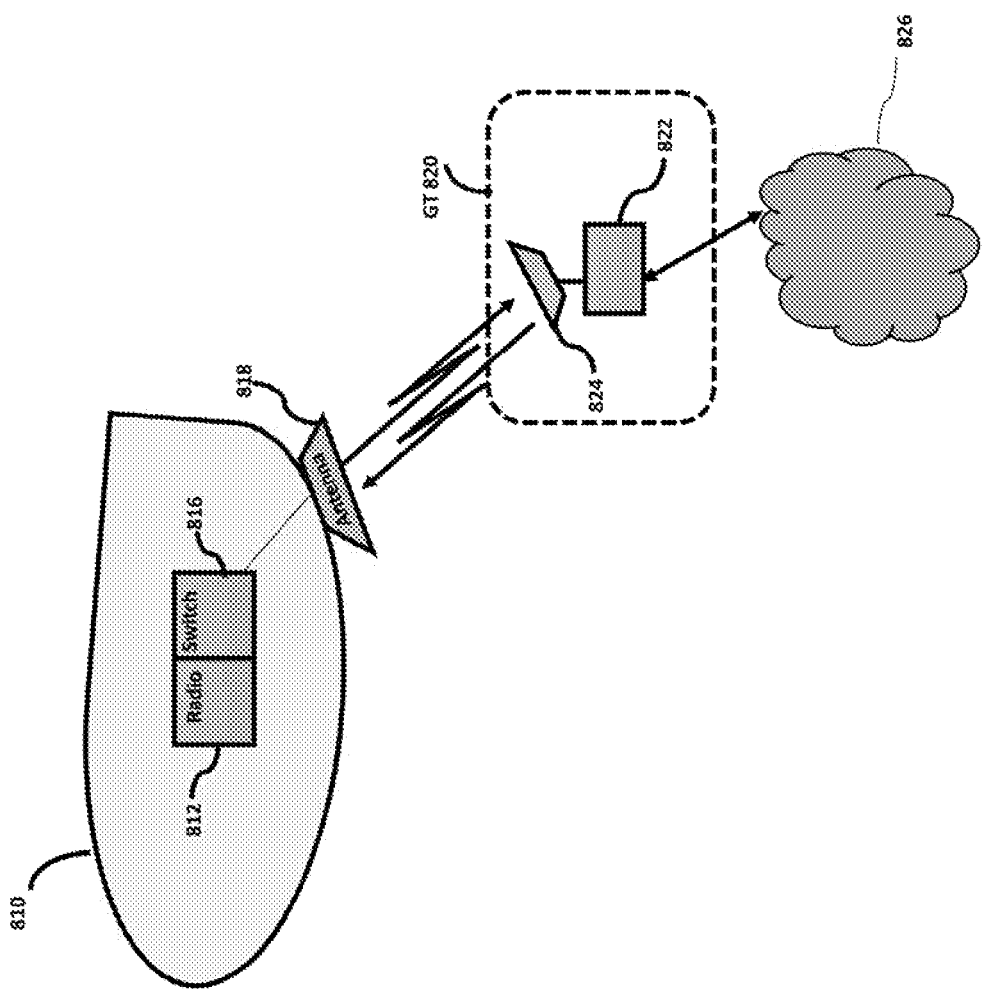
FIG. 8 is a graphical depiction of an exemplary aerial platform based communications system useful in conjunction with various embodiments described herein.

FIG. 8 shows one exemplary embodiment of an aerial platform 810. The aerial platform communicates with a network of terrestrial sites. In one exemplary embodiment, the aerial platform is an unmanned aerial vehicle (UAV). More generally however, the principles described herein may be used with any aerial platform such as general aviation aircraft, commercial aircraft, and drones. In one exemplary embodiment, the network of terrestrial sites comprises a broadband ground terminal 820. Common examples of such broadband ground terminals include e.g., cellular base stations, IEEE 802.11-based access points, etc. More generally however, the principles described herein may be used with any ground terminal including terminals at home or enterprises to provide network connectivity to an internetwork (e.g., the Internet). The ground terminal may be a fixed ground terminal or mobile terminal including devices attached to platforms such as vehicles, boats, ship, airplanes, trucks, or other vehicles. Some mobile ground terminals are standalone mobile devices (e.g., handheld devices, etc.) In one exemplary embodiment, the ground terminal comprises a cellular base station.

In one exemplary embodiment, the drone 810 has a drone radio sub-system 812, a message switch sub-system 816, and at least one drone antenna aperture sub-system 814 to communicate with the ground terminal 820. During operation, the UAV is configured to cruise or patrol an "orbit" while maintaining communication with the ground terminal 820. The ground terminal 820 may be connected to broader Internet networks 826 via a gateway radio sub-system 822 thereby allowing the ground terminals 820. Internet access and/or access to the terrestrial network. In one exemplary embodiment, the UAV comprises a drone.

Figure 9:
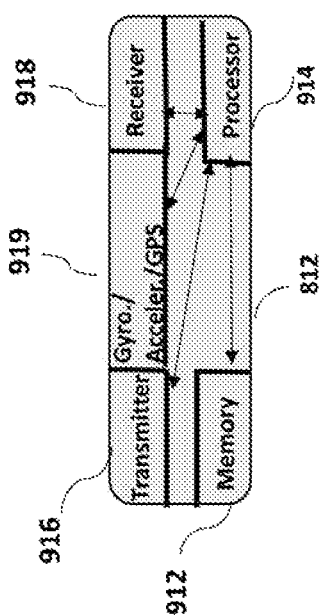
FIG. 9 is a graphical depiction of exemplary radio equipment of an aerial platform useful in conjunction with various embodiments described herein.

FIG. 9 illustrates one exemplary embodiment of an unmanned aerial vehicle (UAV) radio sub-system 912 that includes five (5) sub-systems: (i) a receiver 918 that is configured to demodulate and decode a signal received from a drone antenna aperture sub-system 914; a transmitter 916 that is configured to modulate data received from a processor 914 and send the resulting signal through the drone antenna aperture sub-system 814; a processor sub-system 914 that is configured to carry out functions such as: (i) configuring the receiver 918 and transmitter 916 sub-systems, (ii) processing the data received from the receiver 918 sub-system, (iii) determining the data to be transmitted through the transmitter sub-system 916, and (iv) controlling the antenna sub-system 814; a non-transitory computer readable memory sub-system 912 that is configured to store one or more program code instructions, data, and/or configurations, and system parameter information that are accessed by the processor 914; and (v) a gyroscope/accelerometer/global positioning system (GPS) sub-system 919 that is configured to determine a position and orientation of the UAV such as roll or pitch angles.

Depending on the altitude of the UAV, each UAV covers an area on the ground; in one embodiment the area covered has a radius of as low as a few tens of kilometers (km) to as much as 200 km or more. The UAV's radio sub-system sends aggregated data to/from the internetwork via one or more of the ground terminals 820 of a terrestrial network. Since the ground terminal 820 may handle aggregated data from UAVs 810, practical implementations of the present disclosure may support higher data rates than necessary for a single UAV 810. Accordingly, in one embodiment the gain of the ground terminal 820 antenna sub-system is much larger than the UAV 810, and may transmit at higher power than the UAV 810. Those of ordinary skill in the related arts will readily appreciate the wide variety of techniques which may be used to increase gain, including without limitation, increasing transmit and receive power, increasing bandwidth, increasing processing gain, increasing coding gain, etc.

Figure 10:
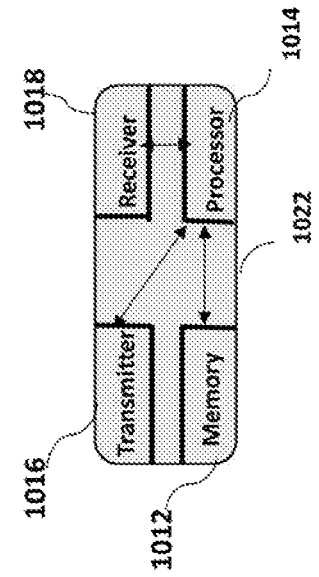
FIG. 10 is a graphical depiction of exemplary radio equipment of a ground terminal useful in conjunction with various embodiments described herein.

Referring back to the embodiment of FIG. 8, the ground terminal (GT) 820 has two (2) main sub-systems: a ground terminal radio sub-system 822, and a ground terminal antenna sub-system 824. As shown in FIG. 10, the GT radio sub-system 822 comprises four (4) sub-systems: (i) the receiver 1018 that demodulates and decodes the signal from the drone antenna sub-system; (ii) the transmitter sub-system 1016 that modulates the data and sends the resulting signal through the antenna sub-system 1024; (iii) the processor sub-system 1014 that carries out functions such as: configuring the receiver 1018 and transmitter 1016 sub-systems, processing the data received from the receiver 1018 sub-system, determining the data to be transmitted through the transmitter sub-system 1016, as well as controlling the antenna sub-system 824; and (iv) the memory sub-system 1012 that contains program code, configuration data, and system parameters information that are accessed by the processor 1014.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Apparatus for receiving broadband access via a network of cell sites comprising one or more base stations, each base station comprising a cell radio sub-system installed to a cell antenna sub-system, each base station configured to form at least one directional beam, the apparatus comprising:
    a drone radio sub-system having at least a transmitter, a receiver, a processor, and a non-transitory medium readable by the processor;
    a position location determination unit; and
    a drone antenna sub-system comprising an antenna aperture configured to form a steerable directional beam;
    wherein the drone radio sub-system is configured to:
        store a plurality of position locations associated with a plurality of cell sites of the network of cell sites;
        instruct the drone antenna sub-system to steer a beam toward a specific cell site based on a drone position coordinate and a specific position coordinate of the specific cell site;
        measure a downlink signal quality measurement on a received signal from the specific cell site; and
        receive uplink signal quality measurements provided within the received signal from the specific cell site, wherein the uplink signal quality measurements are associated with the specific cell site;
    wherein the drone radio sub-system is further configured to:
        divide a network coverage area into a number of contiguous geographic bins;
        maintain a candidate cell site association table with an entry for each one of the number of contiguous geographic bins;
        wherein the candidate cell site association table comprises a list of cell sites that are available to establish a communications link based on an uplink or downlink signal quality;
        wherein for at least one candidate cell site within the list of cell sites:
            measure the downlink signal quality for the at least one candidate cell site, or receive the uplink signal quality from the at least one candidate cell site; and
            associate with the at least one candidate cell site based at least in part on the uplink and downlink signal quality.

2. The apparatus of claim 1, wherein the drone antenna sub-system is further configured to steer the antenna aperture on at least one axis to point the steerable directional beam toward the specific cell site.

3. The apparatus of claim 2, wherein the drone antenna sub-system comprises a mechanical steering mechanism configured to rotate the antenna aperture from a center of the antenna aperture.

4. The apparatus of claim 1, wherein the drone radio sub-system is further configured to hand off to a different cell site when the uplink and downlink signal quality of the communications link to the at least one candidate cell site falls below an acceptable threshold.

5. The apparatus of claim 1, wherein the drone radio sub-system is further configured to hand off to a different cell site based on a current position location and the candidate cell site association table.

6. The apparatus of claim 1, wherein the antenna aperture comprises an array of patch elements with at least one row and at least one column of patch elements.

7. The apparatus of claim 1, wherein the drone radio sub-system is configured to create one or more spread channels that spread encoded bits in time or frequency.

8. The apparatus of claim 7, wherein the drone radio sub-system communicates using an Institute of Electrical and Electronics Engineers (IEEE) 802.11-compliant protocol.

9. The apparatus of claim 8, wherein the IEEE 802.11-compliant protocol is further compliant with an IEEE 802.1 lac standard.

10. The apparatus of claim 7, wherein the received signal is received over the one or more spread channels.

11. The apparatus of claim 1, wherein the drone radio sub-system communicates using a frequency band associated with an unlicensed shared Industrial Scientific and Medical (ISM) band.

* * * * *